Patented July 14, 1953

2,645,624

UNITED STATES PATENT OFFICE 2,645,624

SILANES AND SILOXANES CONTAINING t-ALKOXY RADICALS AND POLYMERS PLASTICIZED AND STABILIZED THEREWITH

Melvin J. Hunter, Midland, Mich., assignor to Dow Corning Corporation, Midland, Mich., a corporation of Michigan No Drawing. Application March 3, 1950, Serial No. 147,565

6 Claims. (Cl. 260—29.1)

The present invention relates to the art of plasticizers.

Hydrocarbon polymers containing aliphatic chlorine are well known. Typical examples of such polymers are polyvinyl chloride, polyvinylidene chloride, and chloroprene, which is polymerized alpha-chlorobutadiene. Another polymer of similar character is hydrochlorinated natural rubber. Plasticizers are normally employed with these polymers. The polymers so plasticized with conventional materials are unstable. When heated, particularly in contact with many metals, decomposition of the polymer occurs, with a darkening of the polymer. For this reason stabilizers are generally employed. During the decomposition hydrogen chloride is evolved. This evolution of hydrogen chloride accelerates the rate of decomposition to form more hydrogen chloride, whereby the decomposition proceeds at an increased rate. The stabilizers which are generally employed react with the hydrogen chloride produced to form a complex addition product. This addition product stays in the polymer. It then becomes a matter of the stability of the addition product so formed. If the polymer is subjected to conditions under which the addition product decomposes with the release of hydrogen chloride, decomposition of the polymer then ensues rapidly.

Objects of the present invention are the provision of novel compounds, the provision of improved stabilizers for hydrocarbon polymers containing aliphatic chlorine, which also act as plasticizers, and the provision of materials which stabilize and plasticize hydrocarbon polymers containing aliphatic chlorine, which combine with hydrogen chloride produced by incipient decomposition with the formation of inactive volatile products containing the chlorine from the hydrogen chloride.

Compositions in accordance with the present invention have the following general formula:

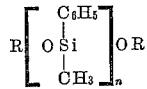

where R represents a tertiary alkyl radical having from four to five carbon atoms and $n$ has an average value of from 1 to 5, inclusive. Further, in accordance herewith these compositions are employed as plasticizing and stabilizing agents in hydrocarbon polymers which contain aliphatic chlorine.

The compositions hereof may be prepared as follows. Phenylmethyldichlorosilane is a well-known chemical intermediate. This may be dissolved in pyridine, using pyridine in excess of the amount necessary to combine with all the hydrogen chloride which may be produced from the chlorine of the silane. Tertiary butyl alcohol may then be added in amount of at least two moles per mole of silane. The tertiary butyl alcohol reacts with the silane to produce as a principal product phenylmethyldi-t-butoxysilane, together with a mixture of siloxanes of the above-stated formula. These products may be separated by filtration from the pyridine hydrochloride which is by-produced. The product is sufficiently stable that it may be washed with water. If desired, the monomeric silane may be separated from the siloxane product by distillation.

In order to increase the yield of siloxane product, the phenylmethyldichlorosilane may initially be partially hydrolyzed and condensed to form siloxanes having from one to five silicon atoms average per molecule. The phenylmethylsilicon oxychloride so produced may then be dissolved in pyridine and handled as above described. By this procedure the yield of monomeric silane in accordance herewith is substantially reduced and the yield of siloxane substantially increased.

Other methods may be employed for the production of the products hereof. Thus, for example, the sodium salts of the phenylmethylsiloxane diols may be reacted with tertiary alkyl chloride. This reaction will proceed metathetically, with the by-production of sodium chloride. Likewise these materials may be produced from phenylmethylethoxysiloxanes by alcohol interchange with a tertiary alcohol.

The compositions hereof are employed by adding them to the hydrocarbon polymers which contain aliphatic chlorine in amount between 0.5 and 15 per cent, based on the weight of the polymer. The compositions hereof are incorporated in the polymers by use of plastic masticators as is conventional in the art.

I have found that other phenylmethylsilanes and siloxanes are of utility as plasticizers. However, these other silanes and siloxanes are not of utility as stabilizing agents, even including materials equivalent to the compositions hereof which contain normal butoxy in place of tertiary butoxy.

It is well known in the art of hydrocarbon polymers containing aliphatic chlorine that various additives are employed with such polymers. In the present application, by reference to the compositions which consist essentially of such polymers, it is intended to include those products consisting of the polymers but which may have minor proportions of various other addition agents such as coloring matter, as well as the silane and siloxane products hereof.

Example 1

Phenylmethyldichlorosilane in amount of 477.5 grams was dissolved in one liter of toluene. A mixture of 435 grams of pyridine and 407 grams of t-butanol was then added to the phenylmethyldichlorosilane solution. The addition was made gradually with cooling and stirring. Following the addition, the reaction product was allowed to stand to come to room temperature, whereupon it was filtered to separate the crystallized pyridine hydrochloride. The filtrate was washed with water. The product was a composition in accordance with the above formula. This composition was then distilled whereby to separate out of the mixture the phenylmethyldi-t-butoxysilane. A yield of this silane in amount of 300 grams was obtained. The boiling point of this product is about 150° C. at a pressure of .5 mm. mercury. The residue was a composition in accordance with the above empirical formula which had a higher value for $n$ than the composition prior to the distillation of the silane.

Example 2

A solution of 477.5 grams of phenylmethyldichlorosilane in one liter of toluene was prepared. Water in amount of 16.9 grams was then added to the solution, whereby to hydrolyze three quarters of the chlorine present with the production of a tetrameric linear siloxane. A solution was then prepared of 120.1 grams of tertiary amyl alcohol in 109 grams of pyridine. The solution of tertiary amyl alcohol in pyridine was added gradually to the siloxane solution. Reaction occurred, with the replacement of the chlorine by tertiary amyloxy radicals. The reaction mixture was cooled to room temperature and then filtered to remove the pyridine hydrochloride. The product was washed with water until substantially free of pyridine and pyridine hydrochloride. The product will be a siloxane having an average of approximately four silicon atoms per molecule and conforming to the above empirical formula.

Example 3

When the silane and siloxane products of Example 1 and the siloxane product of Example 2 are employed as plasticizers for polyvinyl chloride, polyvinylidene chloride, chloroprene, and hydrochlorinated rubber, stabilization as well as plasticization is obtained.

That which is claimed is:

1. Compositions of the empirical formula

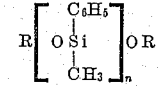

where R represents a tertiary alkyl radical having from four to five carbon atoms and $n$ has an average value of from 1 to 5, inclusive.

2. $C_6H_5CH_3Si(OR)_2$ where R represents a tertiary alkyl radical having from four to five carbon atoms.

3. A composition of matter which comprises as its principal constituent a chlorohydrocarbon high polymer and which contains from 0.5 to 15 per cent of a composition having the empirical formula

where R represents a tertiary alkyl radical having from four to five carbon atoms and $n$ has an average value of from 1 to 5, inclusive.

4. Compositions in accordance with claim 3 in which the hydrocarbon polymer is polyvinylidene chloride.

5. Compositions in accordance with claim 3 in which the hydrocarbon polymer is polyvinyl chloride.

6. Compositions in accordance with claim 3 in which the hydrocarbon polymer is chloroprene.

MELVIN J. HUNTER.

References Cited in the file of this patent

UNITED STATES PATENTS

| Number | Name | Date |
|---|---|---|
| 2,415,389 | Hunter | Feb. 4, 1947 |
| 2,486,162 | Hyde | Oct. 25, 1949 |
| 2,502,286 | Sowa | Mar. 28, 1950 |
| 2,521,673 | Britton et al. | Sept. 12, 1950 |
| 2,529,956 | Myles et al. | Nov. 14, 1950 |
| 2,566,957 | Pedlow et al. | Sept. 4, 1951 |

OTHER REFERENCES

Peppard et al., Journal American Chem. Soc., vol. 68, Jan. 1946, pp. 70 to 73.